2 Sheets—Sheet 1.

H. L. JOHNSTONE,

Assignor to EXCELSIOR LIFE SAVING CAR COUPLING COMPANY.

CAR COUPLING.

No. 10,489. Reissued June 17, 1884.

Witnesses:
Jas. E. Hutchinson
Henry C. Hazard

Inventor.
Henry L. Johnstone, by
Cornelius Russell, his Atty.

N. PETERS. Photo-Lithographer. Washington. D. C.

2 Sheets—Sheet 2.

H. L. JOHNSTONE,

Assignor to EXCELSIOR LIFE SAVING CAR COUPLING COMPANY.

CAR COUPLING.

No. 10,489. Reissued June 17, 1884.

Witnesses:
Jas. E. Hutchinson.
Henry C. Hazard

Inventor:
Henry L. Johnstone, by
Lindlev & Russell, his Attys

N. PETERS, Photo-Lithographer, Washington, D. C.

UNITED STATES PATENT OFFICE.

HENRY L. JOHNSTONE, OF PALMETTO, GEORGIA, ASSIGNOR TO EXCELSIOR LIFE SAVING CAR COUPLING COMPANY, OF NEW YORK, N. Y.

CAR-COUPLING.

SPECIFICATION forming part of Reissued Letters Patent No. 10,489, dated June 17, 1884.

Original No. 286,307, dated October 9, 1883. Application for reissue filed November 16, 1883.

*To all whom it may concern:*

Be it known that I, HENRY L. JOHNSTONE, of Palmetto, in the county of Campbell, State of Georgia, did invent certain new and useful Improvements in Car-Couplings, for which Letters Patent No. 286,307 were issued to me upon the 9th day of October, 1883, which Letters Patent have been found defective in that the specification and claims do not cover and embrace all of the original invention as set forth in the original application filed in the Patent Office on the 23d day of August, 1883. Now, therefore, being desirous of reissuing said Letters Patent, herewith surrendered, I have prepared and do hereby declare that the following is a full, clear, and exact description of the said invention, reference being had to the accompanying drawings, making a part of this specification, in which—

Figure 1:
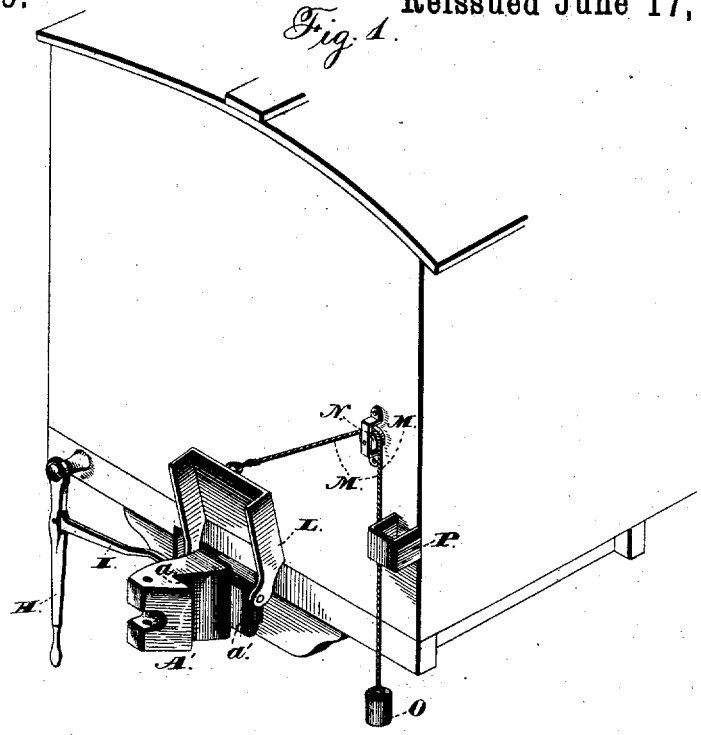
Figure 2:
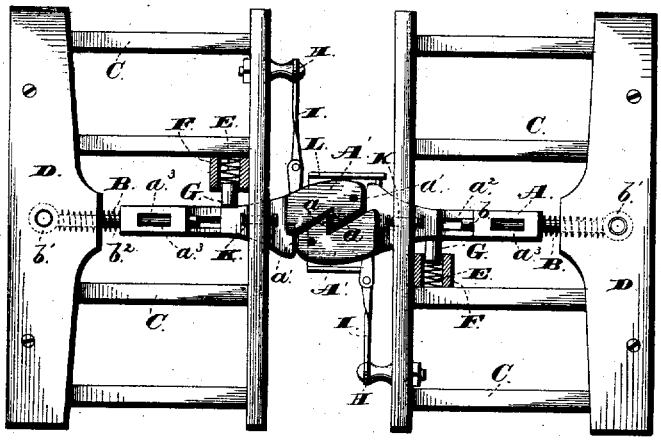
Figure 3:
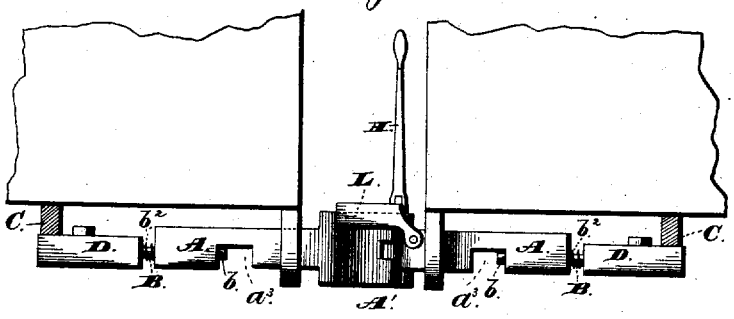
Figure 4:
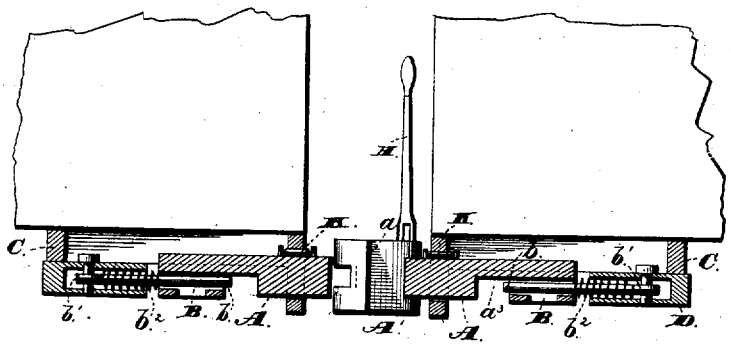
Figure 5:
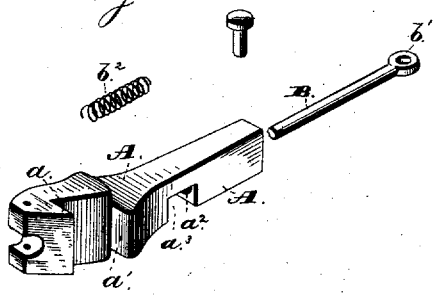

Figure 1 is a perspective view of one end of a car having attached thereto my improved coupling. Fig. 2 is a plan view of the lower side of two car-platforms connected by means of said coupling. Fig. 3 is a side elevation of the same. Fig. 4 is a like view of said cars with the draw-bars and cross-beam in vertical section upon a line with the draft, and Fig. 5 is an enlarged perspective view of the parts composing the coupling separated from each other.

Letters of like name and kind refer to like parts in each of the figures.

This invention belongs to a class of devices which are known as "twin-jaw couplings," and is designed to increase the efficiency and safety and to lessen the expense of the same; to which end said invention consists, principally, in a car-coupling composed of a head and body formed in one piece, a draw-rod fitted axially within the rear end of said body, and adapted to move longitudinally within the same, and to have its rear projecting end pivoted upon the frame of a car, and a buffer-spring placed around said draw-rod in rear of said draw-bar, substantially as and for the purpose hereinafter specified.

It consists, further, in a laterally-swinging car-coupling composed of a head and body formed in one piece, a draw-rod fitted axially into and adapted to move longitudinally within the rear portion of said body, with its rear projecting end pivoted upon the frame of a car, and means, substantially as shown, whereby said head and body are held with a yielding pressure in position to maintain engagement with another similar coupling, substantially as and for the purpose hereinafter described.

It consists, further, in combining, with the laterally-swinging heads of twin-jaw couplings a locking-plate which is adapted to be moved vertically over two engaging-heads, and to embrace the outer sides of the same to prevent accidental disengagement, substantially as hereinafter set forth.

It consists, finally, in the special construction of the parts of the coupling, substantially as and for the purpose hereinafter shown.

In the annexed drawings, A represents the body of my coupling or draw bar, which is composed of a straight square bar which, upon its front end, is provided with a head, A′, that has within its inclined engaging-face a hook, *a*, and at the rear end of the same a shoulder, *a′*, which has substantially a right angle to the longitudinal axis of the bar. Said hook *a* has its rear engaging-face at or near to a right angle to the longitudinal axis of said draw-head, and said face is arranged laterally so as to extend to substantially equal distances each side of said axis. Within the body of the draw-bar A is provided an axial opening, $a^2$, which extends from its rear end nearly to the head A′, and at the latter point is intersected by a transverse groove, $a^3$, which is cut within the lower side of said bar. Within said axial opening is loosely fitted a correspondingly-shaped rod, B, that is adapted to slide longitudinally therein, and is prevented from being withdrawn by a pin, *b*, or other like means passed transversely through its front end within the said groove $a^3$. The rear end of said rod, which projects to a considerable distance, is provided with an eye, *b′*, or other equivalent means whereby it may be pivoted upon a fixed support. The draw-bar thus constructed is placed in position within or below the frame C of a car, with its body A suitably supported and permitted to move laterally, and its head A′ projecting beyond said frame, while the rear end of the rod B is pivoted upon or within a cross-beam, D, that furnishes a bearing upon which said draw-bar swings in a horizontal plane. Between the rear end of said draw-bar and the eye $b'$, around said rod B, is placed a spring, $b^2$, which operates to hold said draw-bar with a yielding pressure at the outer limit of its motion, and forms of the same a spring-buffer that will resist in the ordinary manner an inward pressure from another car. The draw-bar A is held with a yielding pressure at the limit of its horizontal movement in one direction by means of a spiral spring, E, which is placed between the side of said draw-bar opposite to the hook $a$ and one of the adjacent fore-and-aft beams of the frame C. In order that said spring may be held in place and properly protected from injury, it is inclosed within a cylindrical casing, F, which is secured to said frame, and between said spring and said draw-bar is placed a block, G, that is adapted to slide longitudinally within said casing as said draw-bar is moved to compress said spring or permit the same to expand. By this arrangement the block G only is exposed and the durability and certainty of action of the spring are materially increased.

Upon the coming together of two cars provided with my coupling the inclined engaging-faces of the heads of the respective couplings will impinge and force each other horizontally outward until their hook-shoulders have passed, when, by the action of the laterally-moving springs, said heads will be forced inward until engagement results, as shown in Fig. 2.

To enable the coupling-heads to be released from engagement when it is desired to uncouple the cars, a lever, H, is pivoted at one end upon the end of the frame C at either side of the car, and at a suitable point above its pivotal bearing has pivoted one end of a rod, I, that from thence extends horizontally to and is connected with the draw-head A'. By a suitable movement of the free end of said lever, said draw-head may be moved to and held in the proper position to release it from engagement with another connecting draw-head. While preferably arranged to extend upward from its pivotal bearing, said lever H may, if desired, be extended downward or in a reverse direction.

In order that the friction caused by the weight of the coupling-bar may be diminished and its lateral movements rendered easy, a roller, K, is journaled upon or within the outer portion of the frame C in position to furnish a rolling support for said bar.

For the purpose of locking the coupling-heads in engagement, so as to prevent them from becoming disengaged by the motion of the cars, a U-shaped plate, L, is hinged or pivoted to one of the heads A' in such manner as to permit it to be turned downward over the same and its connecting-head, as shown in Fig. 2, or turned upward to the position seen in Fig. 1. When in the position shown in Fig. 2, said plate L effectually prevents all relatively lateral movement of said heads, but when turned upward leaves them free. The locking-plate L is raised or lowered by means of a chain, M, which has one end secured to the outer end of said plate, and from thence passes upward and around a pulley, N, that is placed upon the end of the car. A weight, O, secured to the opposite end of said chain, overbalances said plate, and operates to hold the latter in an elevated position. When it is desired to turn said locking-plate downward into engagement with the coupling-heads, said weight is raised and placed within a pocket, P, which is provided for such purpose.

Having thus fully set forth the nature and merits of my invention, what I claim as new is—

1. A car-coupling composed of a head and body formed in one piece, a draw-rod fitted axially within the rear end of said body, and adapted to move longitudinally within the same, and to have its rear projecting end pivoted upon the frame of a car, and a buffer-spring placed around said draw-rod in rear of said draw-bar, substantially as and for the purpose specified.

2. A laterally-swinging car-coupling composed of a head and body formed in one piece, a draw-rod fitted axially into and adapted to move longitudinally within the rear portion of said body, with its rear projecting end pivoted upon the frame of a car, and means, substantially as shown, whereby said head and body are held with a yielding pressure in position to maintain engagement with another similar coupling, substantially as and for the purpose described.

3. In combination with the laterally-swinging heads of twin-jaw couplings, a locking-plate which is adapted to be placed over two engaging-heads, and to embrace the outer sides of the same to prevent accidental disengagement, substantially as set forth.

4. The hereinbefore-described car-coupling, consisting of the body A, provided with the head A', hook $a$, shoulder $a'$, and axial opening $a^2$, the rod B, pivoted to the frame C, and fitted to and adapted to slide within said opening $a^2$, the spiral spring $b^2$, placed around said rod, the laterally-operating spring E, casing F, and block G, the lever H, and rod I, all combined to operate in the manner and for the purpose shown.

In testimony that I claim the foregoing I have hereunto set my hand this 15th day of October, A. D. 1883.

H. L. JOHNSTONE.

Witnesses:
HENRY C. HAZARD,
GEO. S. PRINDLE.